United States Patent [19]
Rose, Sr.

[11] Patent Number: 5,831,344
[45] Date of Patent: Nov. 3, 1998

[54] VEHICLE ANTI-THEFT SYSTEM

[76] Inventor: Robert E. Rose, Sr., P.O. Box 21616, Long Beach, Calif. 90801

[21] Appl. No.: 791,659

[22] Filed: Jan. 30, 1997

[51] Int. Cl.$^6$ .................................................. B60R 25/00
[52] U.S. Cl. ..................... 307/10.3; 307/10.2; 307/10.4; 180/287; 439/952
[58] Field of Search .................................... 439/952, 189; 307/9.1–10.8; 340/426; 180/287

[56] References Cited

U.S. PATENT DOCUMENTS

| | | | |
|---|---|---|---|
| 2,860,314 | 11/1958 | Daniels et al. | 439/189 |
| 3,004,170 | 10/1961 | Greenspan | 439/189 |
| 4,945,872 | 8/1990 | Embry | 439/952 |
| 5,201,668 | 4/1993 | Endo et al. | 439/189 |
| 5,359,230 | 10/1994 | Namiki et al. | 307/10.1 |
| 5,506,563 | 4/1996 | Jonic | 340/426 |

*Primary Examiner*—Jeffrey A. Gaffin
*Assistant Examiner*—Peter Ganjian

[57] ABSTRACT

A new vehicle anti-theft system for preventing theft of motor vehicles. The inventive device includes a module which is mounted within the vehicle's dashboard and which is connected to the vehicle's electrical power system and the vehicle's ignition system, and an audio unit which releasably connects with the module and which includes an electrical connection associated therewith which connects the electrical power system to the ignition system when the audio unit is connected to the module thus permitting the vehicle to be started. When the audio unit is disconnected from the module, the electrical power system and the ignition system are disconnected which prevents the vehicle from being started until the audio unit is again connected to the module.

4 Claims, 2 Drawing Sheets

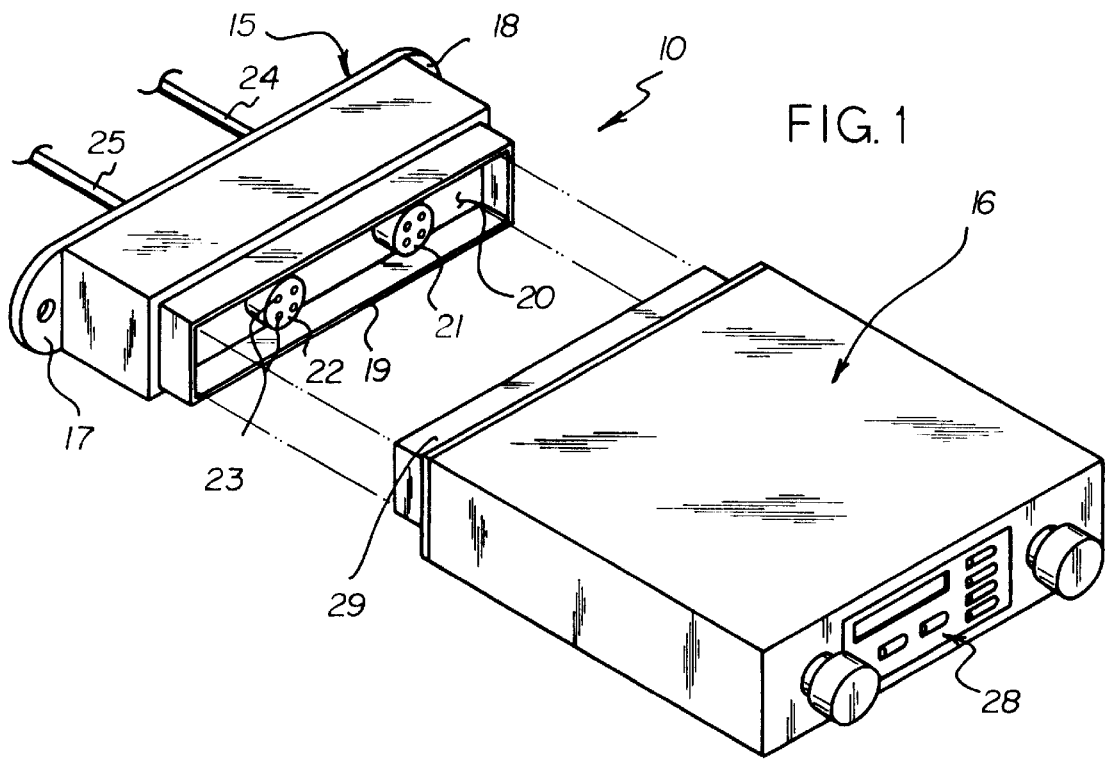
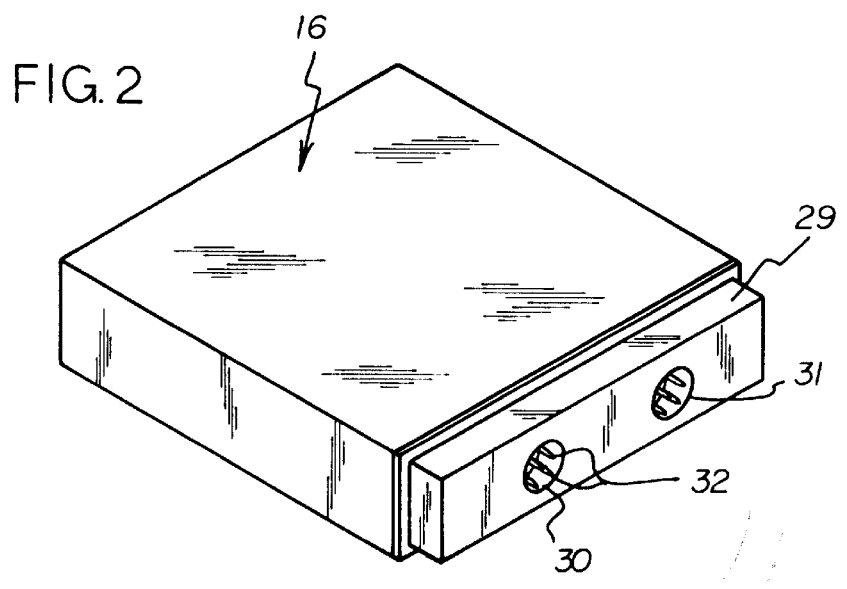

VEHICLE ANTI-THEFT SYSTEM

BACKGROUND OF THE INVENTION

1. Field of the Invention

The present invention relates to anti-theft systems in vehicles and more particularly pertains to a new vehicle anti-theft system for preventing theft of motor vehicles.

2. Description of the Prior Art

The use of anti-theft systems in vehicles is known in the prior art. More specifically, anti-theft systems in vehicles heretofore devised and utilized are known to consist basically of familiar, expected and obvious structural configurations, notwithstanding the myriad of designs encompassed by the crowded prior art which have been developed for the fulfillment of countless objectives and requirements.

Known prior art anti-theft systems in vehicles include U.S. Pat. No. 5,054,119; U.S. Pat. No. 4,683,462; U.S. Pat. No. 4,960,623; U.S. Pat. No. 4,808,981; U.S. Pat. No. 4,248,069 and U.S. Pat. No. 5,142,701. All of these prior art systems are directed towards preventing theft of audio devices within vehicles, not to the prevention of theft of the vehicle itself.

While these devices fulfill their respective, particular objectives and requirements, the aforementioned patents do not disclose a new vehicle anti-theft system. The inventive device includes a module which is mounted within the vehicle's dashboard and which is connected to the vehicle's electrical power system and the vehicle's ignition system, and an audio unit which releasably connects with the module and which includes an electrical connection associated therewith which connects the electrical power system to the ignition system when the audio unit is connected to the module thus permitting the vehicle to be started. When the audio unit is disconnected from the module, the electrical power system and the ignition system are disconnected which prevents the vehicle from being started.

In these respects, the vehicle anti-theft system according to the present invention substantially departs from the conventional concepts and designs of the prior art, and in so doing provides an apparatus primarily developed for the purpose of preventing theft of motor vehicles.

SUMMARY OF THE INVENTION

In view of the foregoing disadvantages inherent in the known types of anti-theft systems in vehicles now present in the prior art, the present invention provides a new vehicle anti-theft system construction wherein the same can be utilized for preventing theft of motor vehicles.

The general purpose of the present invention, which will be described subsequently in greater detail, is to provide a new vehicle anti-theft system apparatus and method which has many of the advantages of the anti-theft systems in vehicles mentioned heretofore and many novel features that result in a new vehicle anti-theft system which is not anticipated, rendered obvious, suggested, or even implied by any of the prior art anti-theft systems in vehicles, either alone or in any combination thereof.

To attain this, the present invention generally comprises a module which is mounted within the vehicle's dashboard and which is connected to the vehicle's electrical power system and the vehicle's ignition system, and an audio unit which releasably connects with the module and which includes an electrical connection associated therewith which connects the electrical power system to the ignition system when the audio unit is connected to the module thus permitting the vehicle to be started. When the audio unit is disconnected from the module, the electrical power system and the ignition system are disconnected which prevents the vehicle from being started.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicle anti-theft system apparatus and method which has many of the advantages of the anti-theft systems in vehicles mentioned heretofore and many novel features that result in a new vehicle anti-theft system which is not anticipated, rendered obvious, suggested, or even implied by any of the prior art anti-theft systems in vehicles, either alone or in any combination thereof.

It is another object of the present invention to provide a new vehicle anti-theft system which may be easily and efficiently manufactured and marketed.

It is a further object of the present invention to provide a new vehicle anti-theft system which is of a durable and reliable construction.

An even further object of the present invention is to provide a new vehicle anti-theft system which is susceptible of a low cost of manufacture with regard to both materials and labor, and which accordingly is then susceptible of low prices of sale to the consuming public, thereby making such vehicle anti-theft system economically available to the buying public.

Still yet another object of the present invention is to provide a new vehicle anti-theft system which provides in the apparatuses and methods of the prior art some of the advantages thereof, while simultaneously overcoming some of the disadvantages normally associated therewith.

Still another object of the present invention is to provide a new vehicle anti-theft system for preventing theft of motor vehicles.

Yet another object of the present invention is to provide a new vehicle anti-theft system which includes a module which is mounted within the vehicle's dashboard and which is connected to the vehicle's electrical power system and the vehicle's ignition system, and an audio unit which releasably connects with the module and which includes an electrical connection associated therewith which connects the electrical power system to the ignition system when the audio unit is connected to the module thus permitting the vehicle to be started. When the audio unit is disconnected from the module, the electrical power system and the ignition system are disconnected which prevents the vehicle from being started.

Still yet another object of the present invention is to provide a new vehicle anti-theft system that in addition to preventing theft of the vehicle, it eliminates the threat of theft of the vehicle's audio unit since it is removed from the vehicle.

Even still another object of the present invention is to provide a new vehicle anti-theft system that eliminates the hassle of insurance claims, repairs, and police reports normally required when a vehicle is stolen.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new vehicle anti-theft system according to the present invention.

FIG. 2 is a perspective view of the rear of the audio unit.

DESCRIPTION OF THE PREFERRED EMBODIMENT

Figure 3:
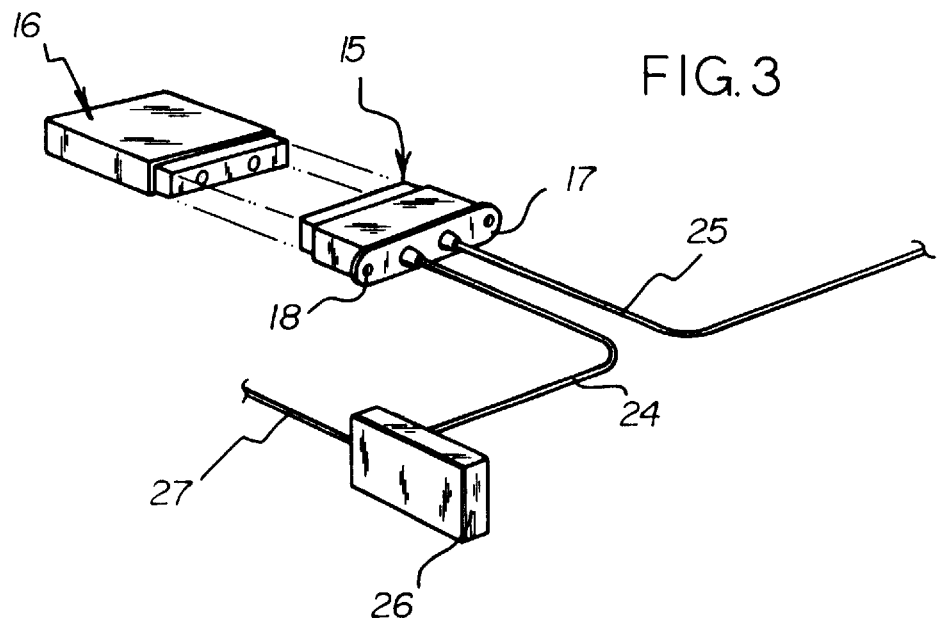
FIG. 3 is a perspective view of the system with the electrical power system and the ignition system.
Figure 4:
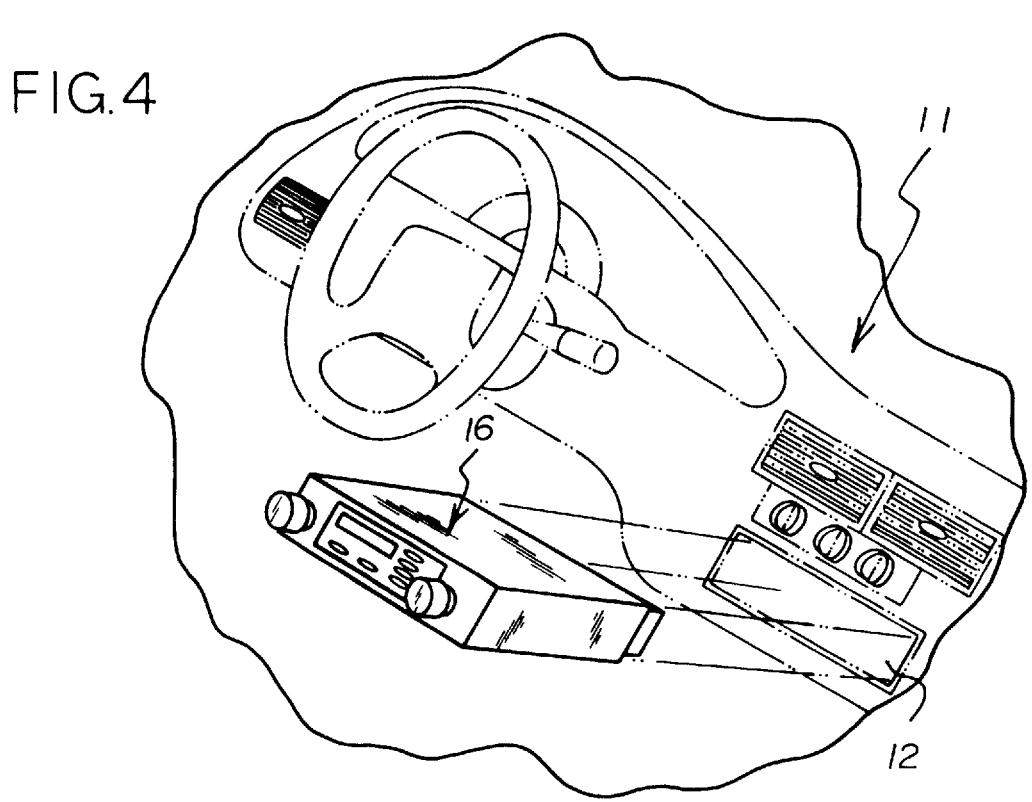
FIG. 4 is a view of the audio unit and the vehicle's dashboard.

With reference now to the drawings, and in particular to FIGS. 1 through 4 thereof, a new vehicle anti-theft system embodying the principles and concepts of the present invention and generally designated by the reference numeral 10 will be described.

More specifically, it will be noted that the vehicle anti-theft system 10 comprises a stationary module 15 and an audio unit 16 releasably connected to the module 15.

As best illustrated in FIGS. 1 through 4, it can be shown that the module 15 includes a pair of flanges 17,18 by which the module can be fixedly mounted within the dashboard 11 of a vehicle. The module 15 includes a wall 19 extending from the front side thereof which defines a rectangular enclosure 20 which receives the rear end of the audio unit 16. A first port 21 and a second port 22 also extend from the front side of the module 15 within the enclosure 20. The ports 21,22 each include a plurality of pin-receiving holes 23, similar to a typical pin/hole type connection.

A line 24 from the vehicle's electrical power system extends through the rear of the module 15 and is electrically connected to the port 21. Similarly, a line 25 from the vehicle's ignition system extends through the rear of the module and electrically connects to the port 22. Referring to FIG. 3, it is seen that the line 24 extends from the vehicle's fuse box 26 which is itself connected to the vehicle's power supply (i.e. battery) by line 27.

The ignition system of the vehicle (i.e. spark plugs, distributor, etc.) in a normal vehicle is connected to the electrical power system such that when the key in the ignition is turned, the vehicle is able to start. However, in the instant invention, the electrical power system and the ignition system are separated by the module, and a means must be provided to electrically connect the two systems so that when the key is turned the vehicle may start.

In the instant invention, such means is provided by the audio unit 16 of the vehicle. The term audio unit as used throughout the description and claims is meant to include radios, tape players, CD players, and the like, and combinations of the three. As illustrated in FIG. 1, the audio unit 16 is a combination radio and tape player having the appropriate controls 28 on the front face of the unit 16 to control the operation of the unit. The audio unit 16 is releasably connectable with the module 15 to complete the circuit between the lines 24 and 25.

Extending from the rear of the audio unit 16 is a projection 29 which is sized to snugly fit inside the wall 19 and within the enclosure 20. The projection 29 includes a plurality of holes 30,31 which matingly receive the ports 21,22, respectively. Within each hole 30,31 are located connecting means in the form of pins 32 which are respectively received within the holes 23 in the ports 21,22. The pins 32 in hole 30 are electrically connected to the pins 32 in hole 31 by a suitable electrical circuit within the audio unit 16. Such a circuit can be merely a simple electrical connection between the pins 32 such that when the pins are received within the holes 23, a circuit is completed between the lines 24,25. Such an electrical connection is believed to be obvious to one having ordinary skill in the art and is therefore not shown nor further described.

The pins 32, similarly to the holes 23, are generally similar to those found in typical pin/hole type connections. In such connections, the configuration of the holes and pins must be equivalent or else the pins will not fit within the holes and an electrical connection will not be established. In the instant case therefore, it is clear that if the pin and hole configurations are not the same, the ports 21,22 will not fit into the holes 30,31, the pins 32 will not fit into the holes 23, and an electrical connection will not be established between the lines 24,25. By varying the pin and hole configurations of each module and audio unit assembly, each audio unit can only be connected with a single module having an identical hole configuration, thus preventing a thief from using a similar audio unit to complete the connection between the lines 24,25. An extremely large number of pin/hole configurations can be produced by varying the number, shape, and location of the pins and holes.

As is clear from the above description and from FIGS. 1–4, the audio unit 16 can be selectively connected to, and disconnected from, the module 15 by sliding the unit into and out of the dashboard 11. For this purpose, the dashboard includes an aperture 12 therein for receiving the unit 16. When mounted, the controls 28 of the unit will be approximately flush with the dashboard face, as is conventional. The aperture 12 can include brackets therein (not illustrated) which support the sides of the unit 16 to mount the unit in a stationary manner, as is conventional.

When the unit 16 is connected to the module 15, the ports 21,22 are received within the holes 30,31 and the pins 32 fit within the holes 23. Thus an electrical connection is established between the electrical power system and the ignition system, which permits the vehicle to be started when the key is turned in the ignition. The vehicle and audio unit otherwise operate as normal. If the driver leaves the vehicle and wishes to protect it from being stolen while not being driven, the driver merely removes the audio unit by sliding it out of the dashboard. Thus an electrical connection does not exist between the electrical power system and the ignition system, so that the vehicle cannot be started by a potential thief. The thief cannot simply slide his own audio unit into the dashboard, since the pin configuration is not likely to match the hole configuration on the ports, so that an electrical connection between the lines 24,25 cannot be established.

For convenience, and to protect the audio unit from dust, sand, moisture and the like, a carrying case can be provided to hold the audio unit when it is removed from the dashboard. The audio unit can thus be easily transported by the driver while away from the vehicle, while simultaneously protecting the unit from the elements.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An anti-theft system for a vehicle having an electrical power system and an ignition system, comprising:

a stationary mounting module adapted for mounting in a dashboard of the vehicle, the mounting module having rearward apertured flanges adapted for coupling the mounting module directly to an interior area of the dashboard of the vehicle;

an audio unit for generating audio signals for producing sound through speakers mounted in the vehicle, the audio unit including a housing having a rearward facing surface and a depth dimension extending perpendicular to the rearward facing surface, and mounting means for removably supporting the audio unit on the mounting module in the dashboard, the mounting means further comprising a female connector on the mounting module and a male connector on the audio unit;

the female connector extending outwardly from the mounting module and surrounding the first and second electrical connections, the female connector further being positioned on a forward facing surface of the mounting module, the female connector comprising a substantially continuous outer perimeter wall positioned proximate and along an outer perimeter of the forward facing surface of the mounting module, the outer perimeter wall having a substantially rectangular shape forming a substantially rectangular cavity on the forward facing surface of the mounting module, the rectangular cavity having a depth less than about one-fifth of the depth of the housing of the audio unit;

the male connector extending forwardly from the rearward surface of the housing of the audio unit, the male connector being matingly couplable to the female connector of the mounting module such that the male connector is releasably engageable to the female connector, the male connector comprising a substantially rectangular protrusion adapted to snugly fit in the substantially rectangular cavity formed by the outer perimeter wall of the female connector to supportingly mount the housing of the audio unit to the mounting module, the protrusion having a protrusion depth of less than about one-fifth of the depth of the housing of the audio unit;

wherein the mounting module has a first electrical connection to the electrical power system and a second electrical connection to the ignition system; and wherein the audio unit includes a power to ignition connecting means for electrically connecting the electrical power system and the ignition system of the vehicle such that when the audio unit is connected to the mounting module the electrical power system and the ignition system of the vehicle are electrically connected and the vehicle is able to be started, and when the audio unit is disconnected from the module the electrical power system and the ignition system are not electrically connected and the vehicle cannot be started.

2. The vehicle anti-theft system of claim 1, wherein the power to ignition connecting means comprises a first plurality of pins connectable with the electrical power system and a second plurality of pins connectable with the ignition system.

3. The vehicle anti-theft system of claim 1, wherein the first plurality of pins and the second plurality of pins have a predetermined configuration, wherein the vehicle is able to be started only when the audio unit having said predetermined pin configurations is connected to the module.

4. An anti-theft system for a vehicle having an electrical power system and an ignition system, comprising:

a stationary mounting module adapted for mounting in a dashboard of the vehicle, the mounting module having rearward apertured flanges adapted for coupling the mounting module directly to an interior area of the dashboard of the vehicle;

an audio unit for generating audio signals for producing sound through speakers mounted in the vehicle, the audio unit including a housing having a rearward facing surface and a depth dimension extending perpendicular to the rearward facing surface, and mounting means for removably supporting the audio unit on the mounting module in the dashboard, the mounting means further comprising a female connector on the mounting module and a male connector on the audio unit;

the female connector extending outwardly from the mounting module and surrounding the first and second electrical connections, the female connector further being positioned on a forward facing surface of the mounting module, the female connector comprising a substantially continuous outer perimeter wall positioned proximate and along an outer perimeter of the forward facing surface of the mounting module, the outer perimeter wall having a substantially rectangular shape forming a substantially rectangular cavity on the forward facing surface of the mounting module, the rectangular cavity having a depth less than about one-fifth of the depth of the housing of the audio unit;

the male connector extending forwardly from a rearward surface of the housing of the audio unit, the male connector being matingly couplable to the female connector of the mounting module such that the male connector is releasably engageable to the female connector, the male connector comprising a substantially rectangular protrusion adapted to snugly fit in the substantially rectangular cavity formed by the outer perimeter wall of the female connector to supportingly mount the housing of the audio unit to the mounting module, the protrusion having a protrusion depth of less than about one-fifth of the depth of the housing of the audio unit;

wherein the mounting module has a first electrical connection to the electrical power system and a second electrical connection to the ignition system; and wherein the audio unit includes a power to ignition connecting means for electrically connecting the electrical power system and the ignition system of the vehicle such that when the audio unit is connected to the mounting module the electrical power system and the ignition system of the vehicle are electrically connected and the vehicle is able to be started, and when the audio unit is disconnected from the module the electrical power system and the ignition system are not electrically connected and the vehicle cannot be started;

wherein the power to ignition connecting means comprises a first plurality of pins connectable with the electrical power system and a second plurality of pins connectable with the ignition system; and wherein the first plurality of pins and the second plurality of pins have a predetermined configuration, wherein the vehicle is able to be started only when the audio unit having said predetermined pin configurations is connected to the module.

* * * * *